United States Patent
Watanabe et al.

(10) Patent No.: US 7,440,376 B2
(45) Date of Patent: Oct. 21, 2008

(54) OPERATION CONDITION SETTING SYSTEM

(75) Inventors: Atsushi Watanabe, Kanagawa (JP);
Junichi Horigome, Tokyo (JP);
Masayoshi Nagata, Tokyo (JP);
Masatoshi Nishino, Tokyo (JP);
Susumu Seino, Kanagawa (JP);
Masahiro Uchida, Chiba (JP)

(73) Assignee: Sony Corporation, Tokyo (JP)

( * ) Notice: Subject to any disclaimer, the term of this patent is extended or adjusted under 35 U.S.C. 154(b) by 190 days.

(21) Appl. No.: 10/554,241

(22) PCT Filed: Feb. 22, 2005

(86) PCT No.: PCT/JP2005/003258

§ 371 (c)(1),
(2), (4) Date: Oct. 10, 2006

(87) PCT Pub. No.: WO2005/083687

PCT Pub. Date: Sep. 9, 2005

(65) Prior Publication Data

US 2007/0091752 A1    Apr. 26, 2007

(30) Foreign Application Priority Data

Feb. 27, 2004  (JP) .............................. 2004-055502

(51) Int. Cl.
*G11B 5/09* (2006.01)
*G11B 7/24* (2006.01)

(52) U.S. Cl. ................ 369/53.2; 369/53.21; 369/53.45; 369/47.12; 369/275.1

(58) Field of Classification Search ...................... None
See application file for complete search history.

(56) References Cited

U.S. PATENT DOCUMENTS 6,934,235 B2 * 8/2005 Seo .......................... 369/59.11
2002/0145962 A1 * 10/2002 Nishio et al. ............. 369/53.23

FOREIGN PATENT DOCUMENTS

| JP | 9-231578 | 9/1997 |
| JP | 2003-59047 | 2/2003 |
| JP | 2005-44511 | 2/2005 |

* cited by examiner

*Primary Examiner*—Muhammad N. Edun
(74) *Attorney, Agent, or Firm*—Oblon, Spivak, McClelland, Maier & Neustadt, P.C.

(57) ABSTRACT

The present invention makes it possible to set an operating condition enabling the best recording characteristic to be obtained for any kind of recording media, even in the case where the recording medium is combined with any kind of drive devices. According to the present invention, even in the case where a unknown and new kind of recording medium is loaded into the drive device, a piece of first operating condition information for an optical system suitable for a combination of the drive device and the new kind of recording media is read from a specific read only area provided for the recording medium, and an operating condition enabling the best operating characteristic to be obtained is set by using the first operating condition information, as a result of which even in the case where any kind of recording medium and any kind of drive device are combined, the operating condition for enabling the best recording characteristic to be obtained for the recording medium, can be set in the drive device.

6 Claims, 6 Drawing Sheets

OPERATION CONDITION SETTING SYSTEM

TECHNICAL FIELD

The present invention relates to an operation condition setting system, which is suitably applied for, for example, the case where a recording characteristic of an optical pickup is set so as to obtain the best recording characteristic for plural kinds of optical disks.

BACKGROUND ART

Conventionally, there is a disk drive device which is arranged to store control information on a laser modulation method for obtaining a recording characteristic suitable for each kind of optical disks loaded to the disk drive device, and to set an operating condition using the control information (for example, see Patent document 1).

The disk drive device first discriminates the kind of optical disks and then performs a recording operation suitable for each kind of the optical disks by using the control information on the laser modulation method preliminarily stored in accordance with the kind of the optical disks, thereby enabling the best recording characteristic to be obtained.

Patent document 1: Japanese Patent No. 2725561

The disk drive device having such configuration, in which the control information on the laser modulation method corresponding to each kind of the optical disks is stored in advance, is capable of coping with only the case where a known kind of optical disk is loaded, but is unable to cope with the case where an unknown new kind of optical disk is loaded, without updating the firmware, as a result of which the disk drive device has a problem that the best recording characteristic for such unknown recording medium cannot be obtained.

DISCLOSURE OF THE INVENTION

The present invention has been made in view of the above described circumstances. An object of the present invention is to propose an operation condition setting system in which even in the case where any kind of drive device and any kind of recording medium are combined, an operating condition enabling the best recording characteristic to be obtained for the recording medium, can be set in the drive device.

In order to solve the above described problem, according to the present invention, there is provided an operation condition setting system, having plural kinds of recording media, and plural kinds of drive devices setting an operating condition for an optical system so as to make the operating condition suitable for each of the plural kinds of recording media, wherein each of the recording media comprises a specific read only area respectively storing plural pieces of first operating condition information for the optical system, which cannot be known by the drive devices as the recording medium is new to the drive devices, and which is suitable for the recording medium new to the drive devices, wherein each of the drive devices comprises: storage means respectively storing plural pieces of second operating condition information for the optical system suitable for the recording media of kinds known to the drive device; discrimination means, in the case where the second operating condition information suitable for one of the plural kinds of recording media loaded into the drive device is stored in the storage means, discriminating the loaded recording medium as one of the known kinds of recording media, and in the case where the second operating condition information suitable for one of the plural kinds of recording media loaded into the drive devices is not stored in the storage means, discriminating the loaded recording medium as the new kind of recording medium; and control means, in the case where the loaded recording medium is discriminated as one of the known kinds of recording media, setting the operating condition for the optical system using the second operating condition information, and in the case where the loaded recording medium is discriminated as the new kind of recording medium, reading the first operating condition information suitable for the drive device from the specific read only area in the new kind of recording medium, and setting the operating condition for the optical system using the first operating condition information.

As a result, even in the case where an unknown new kind of recording medium is loaded into the drive device, the first operating condition information of the optical system suitable for the combination of the drive device and the new kind of recording medium can be read, and an operating condition can be set by using the first operating condition information, so as to enable the best operating characteristic to be obtained.

The recording medium according to the present invention is provided with a specific read only area storing the operating condition information which cannot be known by a known kind of drive device, and which is suitable for making the optical system of the known kind of drive device access the recording medium.

As a result, in the case where a recording medium is loaded into the known kind of drive device, the operating condition information suitable for making the optical system of the known kind of drive device access the recording medium can be read from the read only area, and an operating condition can be set by using the operating condition information.

According to the present invention, it is possible to realize an operation condition setting system, a drive device, and an operation condition setting method, in which even in the case where an unknown new kind of recording medium is loaded into the drive device, the first operating condition information for the optical system suitable for a combination of the drive device and the new kind of recording medium, can be read from the read only area provided for the recording medium, and an operating condition can be set by using the first operating condition information so as to enable the best operating condition to be obtained.

According to the present invention, in the case where a recording medium is loaded into a known kind of drive device, the operating condition information suitable for making the optical system of the known kind of drive device access the recording medium can be read from the read only area, and an operating condition can be set by using the operating condition information.

BEST MODE FOR CARRYING OUT THE INVENTION

In the following, an embodiment according to the present invention is described in detail with reference to the accompanying drawings.

(1) Whole Configuration of Operation Condition Setting System

Figure 1:
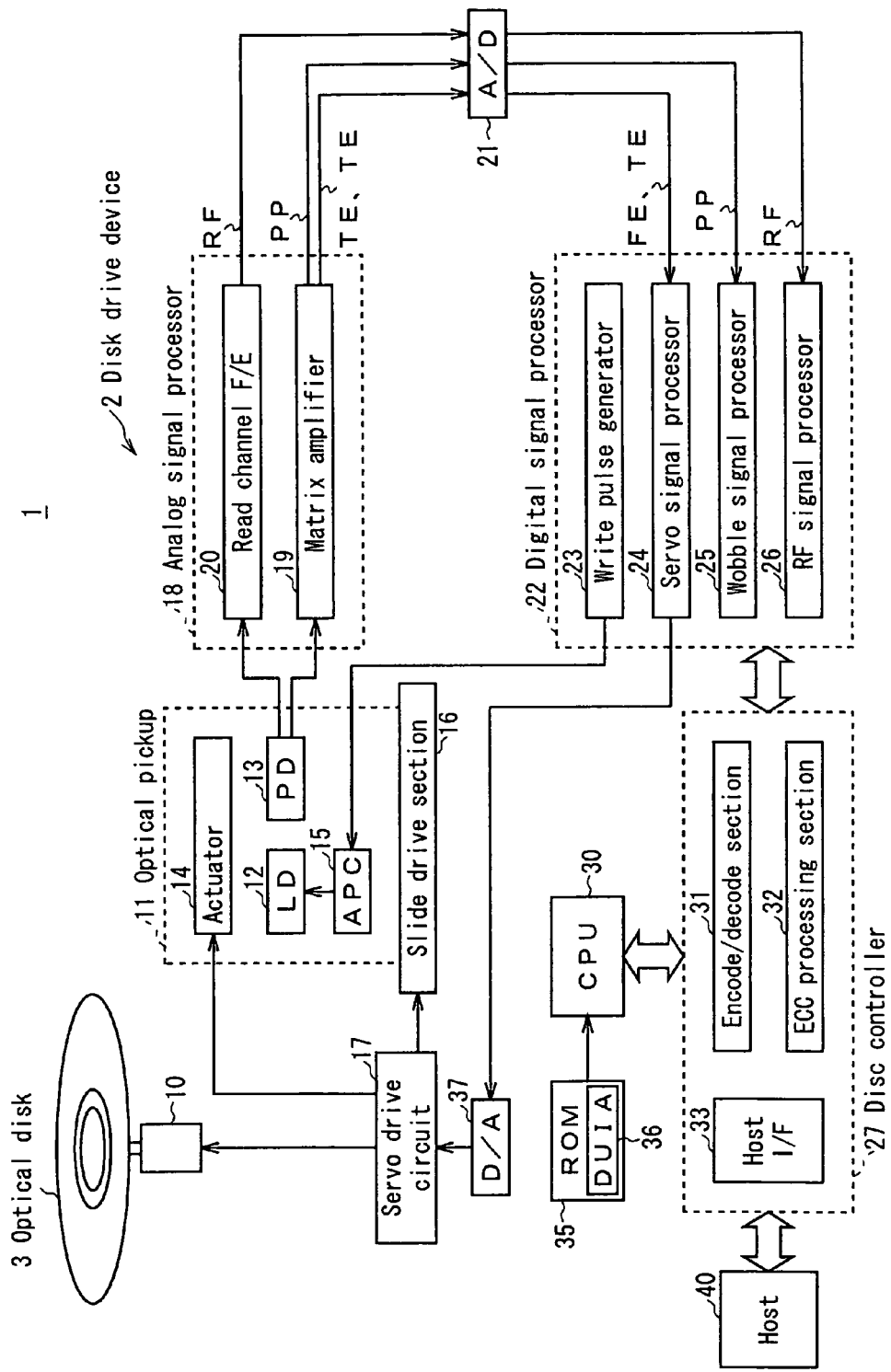
FIG. 1 is a schematic block diagram showing a whole configuration of an operation condition setting system according to the present invention.

In FIG. 1, reference numeral 1 denotes an operation condition setting system according to the present invention as a whole, and is mainly constituted only by a disk drive device 2 and an optical disk 3.

During the recording and reproducing operation, the disk drive device 2 rotatably drives the optical disk 3 placed on a turntable (not shown) by a spindle motor 10 at a CLV (Constant Linear Velocity) or at a CAV (Constant Angular Velocity), to read by an optical pickup 11 data recorded on the optical disk 3 in the form of embossed pits, dyestuff variation pits, and phase variation pits and the like, and ADIP (Address In Pre-groove) information recorded in wobbling grooves.

The optical pickup 11 is mounted with a laser diode 12 serving as a laser light source, a photodetector 13 for detecting a reflected light, a biaxial actuator 14 holding an objective lens serving as a laser beam output end, an APC (Automatic Power Control) circuit 15 performing laser output control of the laser diode 12, and an optical system (not shown) irradiating the laser light to the disk recording surface via the objective lens and guiding the reflected light to the photodetector 13, and movably holds the objective lens by a servo drive circuit 17 via the biaxial actuator 14 in the tracking direction and the focusing direction.

The optical pickup 11, as a whole, can be moved in the radial direction of the optical disk by the servo drive circuit 17 via a slide drive section 16.

In the disk drive device 2, the reflected light from the optical disk 3 is detected by the photodetector 13, and is transmitted to an analog signal processor 18 as an electric signal corresponding to the light quantity received by the photodetector 13.

The analog signal processor 18 performs matrix calculation to the electric signals from each light receiving section of the photodetector 13 by a matrix amplifier 19, to generate, for example, a focus error signal FE, a tracking error signal TE, for servo control, and a push-pull signal PP as wobbling groove information, and also generates a reproduced signal RF by a read channel front end 20.

The focus error signal FE, the tracking error signal TE, the push-pull signal PP, and the reproduced signal RF from the analog signal processor 18 are converted by an analog-to-digital converter 21 into digital signals, respectively, and are then transmitted to a digital signal processor 22.

The digital signal processor 22 which has a write pulse generator 23, a servo signal processor 24, a wobble signal processor 25, and a RF signal processor 26, performs decode processing of the push-pull signal PP by the wobble signal processor 25 to extract the ADIP information.

The wobble signal processor 25 transmits address and physical format information and the like obtained as the ADIP information to a CPU (Central Processing Unit) 30 via a disc controller 27.

The servo signal processor 24 generates various servo drive signals for focus, tracking, slide, and spindle from the focus error signal FE, the tracking error signal TE, and rotational speed information which can be detected, for example, by PLL processing and the like in the RF signal processor 26, and the like, so as to supply the servo drive signals to the servo drive circuit 17 via a digital-to-analog converter 37.

The servo drive circuit 17 drives the biaxial actuator 14 on the basis of the servo drive signals for focus/tracking, and performs focus-servo/tracking-servo operation.

The servo drive circuit 17 also drives the slide drive section 16 on the basis of the slide drive signal, and performs a transfer operation of the optical pickup 11 and rotationally drives the spindle motor 10 on the basis of the spindle servo drive signal.

Further, the servo signal processor 24 transmits various instructions to the servo drive circuit 17 in accordance with instructions from the CPU 30, so as to enable operations of focus search, track jump, seek and the like to be performed.

The RF signal processor 26 performs predetermined signal processing to the reproduced signal RF supplied from the analog-to-digital converter 21 and thereafter transmits the processed signal to a disc controller 27.

The disc controller 27 which has an encode/decode section 31 and an ECC (Error Correcting Code) processing section 32, performs at the time of reproducing, decode processing to the data supplied from the RF signal processor 26 in the encode/decode section 31, and error correction processing in the ECC processing section 32, so as to obtain reproduced data.

In addition, the disc controller 27 extracts sub-code information, address information, management information, and additional information from the information obtained by the decode processing, and supplies these various kinds of information to the CPU 30.

The CPU 30 which functions as a controller of the disk drive device 2, transmits the reproduced data obtained through the decode processing and the error correction processing to an external host unit 40 (for example, personal computer) via a host interface 33.

That is, the CPU 30 which communicates reproduced data, read/write command and the like, with the host unit 40 via the host interface 33, performs reproduction control to the optical disk 3 in accordance with a read command from the host unit 40, and transfers the decoded reproduced data.

On the other hand, the CPU 30 which performs recording operation to the optical disk 3 in response to a write command and record data being supplied from the host unit 40, adds at the time of data recording, error correction codes to the record data supplied from the host unit 40 in the ECC processing section 32, and performs encode processing in the encode/decode section 31.

The CPU 30 supplies the record data subjected to the encode processing to the write pulse generator 23 in the digital signal processor 22, and performs processing such as waveform shaping to the record data via the write pulse generator 23, to transmit the record data as laser modulation data to the APC circuit 15.

The APC circuit 15 drives the laser diode 12 in accordance with the laser modulation data, to make the disk recording surface of the optical disk 3 irradiated with a laser beam having a laser output corresponding to the record data, thereby writing the data on the optical disk 3.

At this time, the CPU 30 reads disk information in advance, from a specific region provided on the innermost peripheral side of the optical disk 3, and controls the write pulse generator 23 so as to make the write pulse generator irradiate only during the irradiation time of the laser beam, which time is set on the basis of the disk information, thereby enabling the best recording characteristic to be obtained in the optimal reflectance.

Here, the disk information is the recording condition information indicating the rising timing and the falling timing of the laser beam which comply with a prescribed standard, and serving as a reference for enabling the disk drive device 2 to obtain the best recording characteristic.

Accordingly, if the CPU 30 is capable of irradiating the laser beam from the optical pickup 11 during the irradiation time corresponding to the pulse width indicated by the disk information, the data can be accurately and surely written on the disk recording surface of the optical disk 3, but in practice, there is a case where the best recording characteristic can not be obtained due to an operating characteristic provided for the optical pickup 11.

The CPU 30 also has a non-rewritable drive unique information area (hereinafter referred to as DUIA area) 36 as storage means in a ROM (Read Only Memory) 35, in which DUIA area plural pieces of operating condition information MUI (irradiation time and the like) are respectively stored, for enabling the most excellent recording characteristic in the optimum reflectance to be obtained for each combination of the optical pickup 11 and plural kinds of optical disks of known generations, when the optical pickup 11 performs an recording operation to each of the plural kinds of optical disks of known generations.

Also, in the DUIA area 36 of the ROM 35, not only the above described operating condition information MUI but also generation information Ge indicating which generation the disk drive device 2 itself is, are stored. The generation information Ge which is attached when the recording characteristic of the disk drive device 2 is changed, is the information indicating that the recording performance is also changed with the change of generation.

In practice, the CPU 30 which is connected with the DUIA area 36 of the ROM 35 via an address bus and a data bus of 8 bits, can read the generation information Ge stored in the DUIA area 36 of the ROM 35 to recognize the generation of the disk drive device 2 itself, and can read the operating condition information MUI suitable for optical disks 3 of each disk generation from the DUIA area 36.

(2) Structure Drawing of Optical Disk

Figure 2:
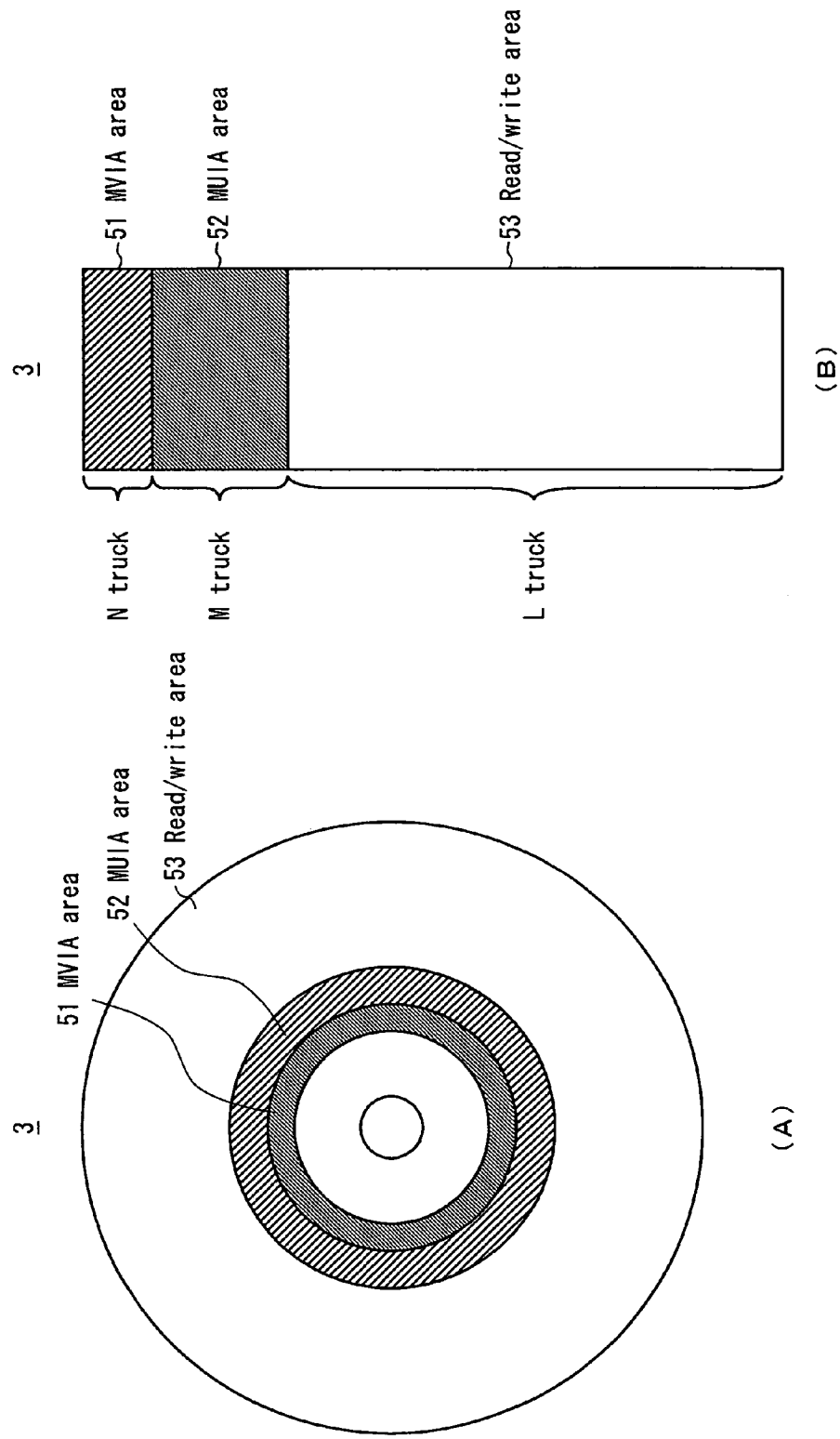
FIG. 2 is a figure showing a structure of an optical disk.

In the optical disk 3, as shown in FIG. 2 (A) and FIG. 2(B), a media version information area (hereinafter referred to as MVIA area) 51 in which the disk generation information of the optical disk 3 is written, is provided in an area by N tracks on the innermost peripheral side of the disk recording surface, while a media unique information area (hereinafter referred to as MUIA area) 52 in which the specific operating condition information MUI indicating recording conditions, such as the irradiation time of the optical pickup 11 to the optical disk 3, is written, is provided in the area by M trucks on the outside of the MVIA area, and a read/write area 53 to be used by a user, is provided in the area by L trucks on the outside of the MUIA area.

Here, the disk generation information written in the MVIA area 51 is the information to be attached when the reflectance of the disk recording surface, the irradiation time of light and the like are changed, and serves to enable the CPU 30 of the disk drive device 2 to discriminate the kind of optical disk 3.

On the other hand, the operating condition information MUI written in the MUIA area 52 is the information which is the same as the information stored in the DUIA area 36 of the ROM 35 in the disk drive device 2, and which is the specific information considered so as to correspond to variations in the laser beam power, the rising time characteristic and the like, of the optical pickup 11 in plural kinds of disk drive devices of currently known generations, and so as to enable the most excellent recording characteristic in the optimal reflectance to be obtained at the time of data recording. For example, the operating condition information MUI includes an irradiation time during which the laser beam is irradiated to the disk recording surface, and the like.

That is, by reading the operating condition information MUI corresponding to the generation of the disk drive device 2, stored in the MUIA area 52 of the optical disk 3, and setting the operation conditions, such as irradiation time of laser beam, on the basis of the operating condition information MUI, the CPU 30 of the disk drive device 2 can create an recording operation environment which inevitably enables the most excellent recording characteristic in the optimal reflectance to be obtained at the time of recording data on the optical disk 3.

Figure 3:
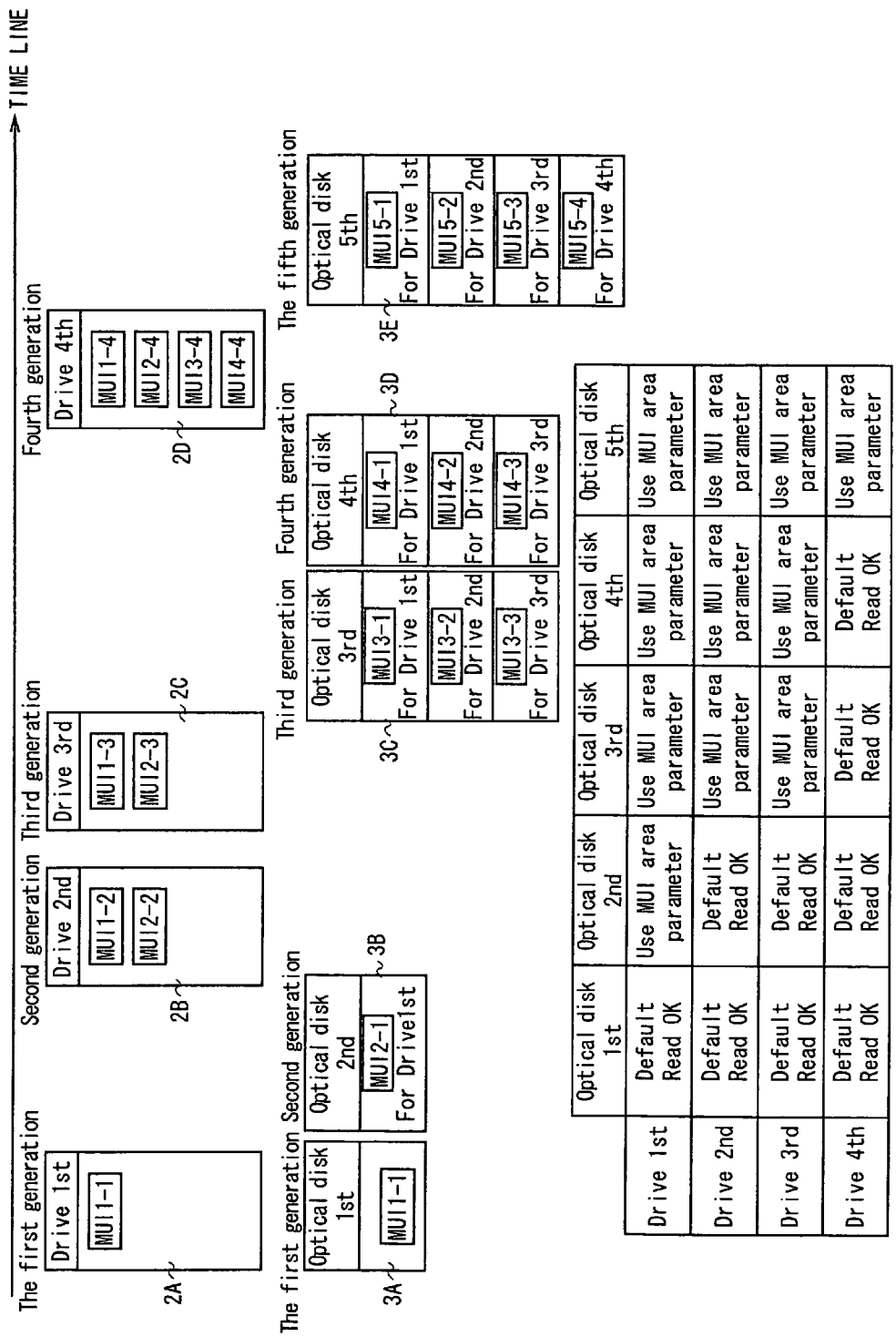
FIG. 3 is a schematic diagram for explaining a complementary relationship between disk drive devices and optical disks.

(3) Complementary Relationship of Disk Drive Device and Optical Disk FIG. 3 shows a relationship enabling the best recording characteristic in the optimum reflectivity to be obtained even for each combination of the disk drives 2 (2A to 2D) of any generation and the optical disks 3 (3A to 3E) of any generation, in the case where the disk drive device 2 is changed from the first generation to the fourth generation as the recording performance of the optical pickup 11 is improved, and where the optical disk 3 is also changed from the first generation to the fifth generation as the recording density is increased and the recording performance is improved by the change of reflectance and the like.

For example, in the case where each of the disk drive device 2A of the first generation and the optical disk 3A of the first generation exists and is known at a certain point of time, the operating condition information MUI 1-1 enabling the most excellent recording characteristic in the optimal reflectance to be obtained for the combination of the disk drive device 2A of the first generation and the optical disk 3A of the first generation is stored in the DUIA area 36 of the ROM3 35 in the disk drive device 2A of the first generation, and the same operating condition information MUI 1-1 as the information stored in the disk drive device 2A is also stored in the MUIA area 52 in the optical disk 3A of the first generation.

On the other hand, in the optical disk 3B of the second generation subsequently developed, the operating condition information MUI 2-1 enabling the most excellent recording characteristic in the optimal reflectance to be obtained for the combination of the disk drive device 2A of the first generation and the new optical disk 3B of the second generation, is stored in the MUIA area 52.

Thereby, in the disk drive device 2A of the first generation, even when the optical disk 3B of the second generation which is unknown and new to the disk drive device 2A of the first generation is loaded, the operating condition information MUI 2-1 is read from the MUIA area 52 in the new optical disk 3B of the second generation and is used by the CPU 30 for setting the operating condition of the optical pickup 11, as a result of which the most excellent recording characteristic in the optimal reflectance for the new optical disk 3B of the second generation can be obtained without updating the firmware.

Next, in the disk drive device 2B of the second generation subsequently developed, there are respectively stored in the DUIA area 36 of the ROM 35, plural pieces of operating condition information MUI 1-2 and MUI 2-2 enabling the most excellent recording characteristic in the optimal reflectance to be obtained for each combination of the disk drive device 2B of the second generation itself with the disk drive device 3A of the first generation and the optical disk 3B of the second generation, which optical disks are known at this point of time.

Also, in the disk drive device 2C of the third generation developed subsequently to the disk drive device 2B of the second generation, there are respectively stored in the DUIA area 36 of the ROM 35, plural pieces of operating condition information MUI 1-3 and MUI 2-3 enabling the most excellent recording characteristic in the optimal reflectance to be obtained for each combination of the disk drive device 2C of the third generation itself with the optical disk 3A of the first generation and the optical disk 3B of the second generation, which optical disks are known at this point of time.

Thereby, in the disk drive device 2B of the second generation and the disk drive device 2C of the third generation, when the optical disk 3A of the first generation or the optical disk 3B of the second generation is loaded, the disk generation information (indicating the first generation or the second generation) stored in the MVIA area 51 in the optical disk 3A of the first generation and the optical disk 3B of the second generation, is read, and the operating condition of the optical pickup 11 is set by using one of plural pieces of operating condition information MUI 1-2, MUI 2-2, MUI 1-3, MUI 2-3, stored in the DUIA area 36, the one of plural pieces of operating condition information corresponding to the disk generation.

In this case, in the disk drive device 2B of the second generation and the disk drive device 2C of the third generation, when the known optical disk 3A of the first generation or the known optical disk 3B of the second generation is loaded, the operating condition can be set using one of plural pieces of operating condition information MUI 1-2, MUI 2-2, MUI 1-3, MUI 2-3, stored in the DUIA area 36 of the disk drive devices themselves, as a result of which the time required for starting up the optical pickup 11 can be reduced correspondingly and the recording operation can be started immediately.

Further, in the optical disk 3C of the third generation subsequently developed, there are respectively stored in the MUIA area 52, plural pieces of operating condition information MUI 3-1, MUI 3-2 and MUI 3-3, enabling the most excellent recording characteristic in the optimal reflectance to be obtained for each combination of the optical disk 3C of the third generation with the disk drive device 2A of the first generation to the disk drive device 2C of the third generation, which disk drive devices are known at this point of time.

Also, in the optical disk 3D of the fourth generation developed subsequently to the optical disk 3C of the third generation, there are respectively stored in the MUIA area 52, plural pieces of operating condition information MUI 4-1, MUI 4-2 and MUI 4-3 enabling the most excellent recording characteristic in the optimal reflectance to be obtained for each combination of the optical disk 3D of the fourth generation with the disk drive device 2A of the first generation to the disk drive device 2C of the third generation, which disk drive devices are known at this point of time.

Thereby, in the disk drive device 2A of the first generation to the disk drive device 2C of the third generation, even when the optical disk 3C of the third generation or the optical disk 3D of the fourth generation, which are unknown and new to the disk drive device 2A of the first generation to the disk drive device 2C of the third generation, is loaded, one of plural pieces of operating condition information MUI 3-1, MUI 3-2, MUI 3-3, MUI 4-1, MUI 4-2, MUI 4-3 is read from the MUIA area 52 of the new optical disk 3C of the third generation or the new optical disk 3D of the fourth generation, and is used by the CPU 30 for setting the operating condition of the optical pickup 11, as a result of which the most excellent recording characteristic in the optimal reflectance can be obtained even for the new disk drive device 3C of the third generation or the new optical disk 3D of the fourth generation without updating the firmware.

Further, in the disk drive device 2D of the fourth generation developed at a later point of time, there are respectively stored in the DUIA area 36 of the ROM 35, plural pieces of operating condition information MUI 1-4, MUI 2-4, MUI 3-4 and MUI 4-4 enabling the most excellent recording characteristic in the optimal reflectance to be obtained for each combination of the disk drive device 2D of the fourth generation itself with the optical disk 3A of the first generation to the optical disk 3D of the fourth generation, which optical disks are known at this point of time.

Thereby, in the disk drive device 2D of the fourth generation, when one of the known optical disk 3A of the first generation to the known optical disk 3D of the fourth generation is loaded, the disk generation information (indicating one of the first to fourth generations) stored in the MVIA area 51 in the optical disk 3A of the first generation to the optical disk 3D of the fourth generation, is read, and the operating condition of the optical pickup 11 is set using one of the plural pieces of operating condition information MUI 1-4, MUI 2-4, MUI 3-4 and MUI 4-4, corresponding to the disk generation.

Also in this case, in the disk drive device 2D of the fourth generation, even when one of the known optical disk 3A of the first generation to the known optical disk 3D of the fourth generation is loaded, the operating condition can be set using one of the plural pieces of operating condition information MUI 1-4, MUI 2-4, MUI 3-4 and MUI 4-4, which are stored in the DUIA area 36 of the disk drive device 2D of the fourth generation itself, as a result of which the time required for starting up the optical pickup 11 can be reduced correspondingly, and the recording operation can be started immediately.

In the optical disk 3E of the fifth generation finally developed, there are respectively stored in the MUIA area 52, plural pieces of operating condition information MUI 5-1, MUI 5-2, MUI 5-3 and MUI 5-4 enabling the most excellent recording characteristic in the optimal reflectance to be obtained for each combination of the optical disk 3E of the fifth generation with the disk drive device 2A of the first generation to the disk drive device 2D of the fourth generation, which disk drive devices are known at this point of time.

Thereby, in the disk drive device 2A of the first generation to the disk drive device 2D of the fourth generation, even when the optical disk 3E of the fifth generation which is unknown and new to the disk drive device 2A of the first generation to the disk drive 2D of the fourth generation, is loaded, one of the plural pieces of operating condition information MUI 5-1, MUI 5-2, MUI 5-3 and MUI 5-4, suitable for the disk drive device 2A of the first generation to the disk drive device 2D of the fourth generation, is read from the MUIA area 52 of the new optical disk 3E of the fifth generation, and is used by the CPU 30 for setting the operating condition of the optical pickup 11, as a result of which the new optical disk 3E of the fifth generation can be coped and the most excellent recording characteristic in the optimal reflectance can be obtained for the new optical disk 3E of the fifth generation, without updating the firmware.

As described above, in the disk drive device 2 (2A to 2D) of each generation, all pieces of operating condition information MUI which are possessed by optical disks 3 (3A to 3E) and which are known at respective point of time, are stored in the DUIA area 36 of the ROM 35 in advance.

On the other hand, in the optical disks 3 (3A to 3E) of each generation, there are stored in the MUIA area 52, all pieces of the operating condition information MUI enabling the most excellent recording characteristic in the optimal reflectance to be obtained, for each combination of each of the optical disks 3 (3A to 3E) with the disk drive devices 2 (2A to 2D) of the generation known at respective point of time.

As a result, in the operation condition setting system 1, the operating condition information MUI enabling the most excellent recording characteristic to be obtained for each combination between the disk drive devices 2 (2A to 2D) of each generation and the optical disks 3 (3A to 3E) of each generation, can be complementarily held in the disk drive devices 2 of each generation and the optical disks 3 of each generation, as a result of which it possible to set in the disk drive device 2 the operating condition enabling the most excellent recording characteristic in the optimal reflectance to be obtained, even for the combination of the disk drive device 2 of unknown new generation and the optical disk 3 of known generation and for the combination of the disk drive device 2 of known generation and the optical disk 3 of unknown new generation.

(4) Generation Information and Operating Condition Information

Figure 4:
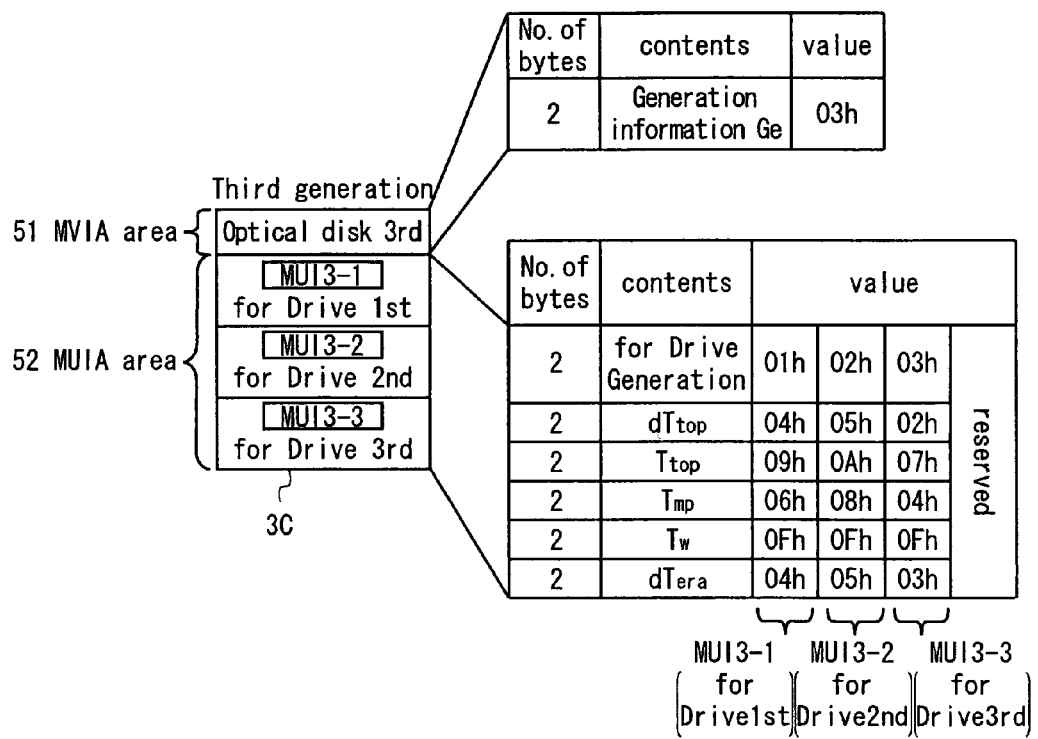
FIG. 4 is a schematic diagram for explaining generation information and operating condition setting.

As shown in FIG. 4, in the MUIA area 51 of the optical disk 3C of the third generation, there is stored, for example, "03h" as the generation information Ge indicating which generation the optical disk 3C itself is. Here, the generation information Ge of "03h" is displayed in hexadecimal notation.

In the MUIA area 52 provided in the optical disk 3C, there are also stored plural pieces of operating condition information MUI 3-1 to MUI 3-3 indicating the irradiation time and the like, corresponding to each of the disk drive devices 2 (2A to 2D).of the first generation "01h"to the third generation "03h".

Figure 5:
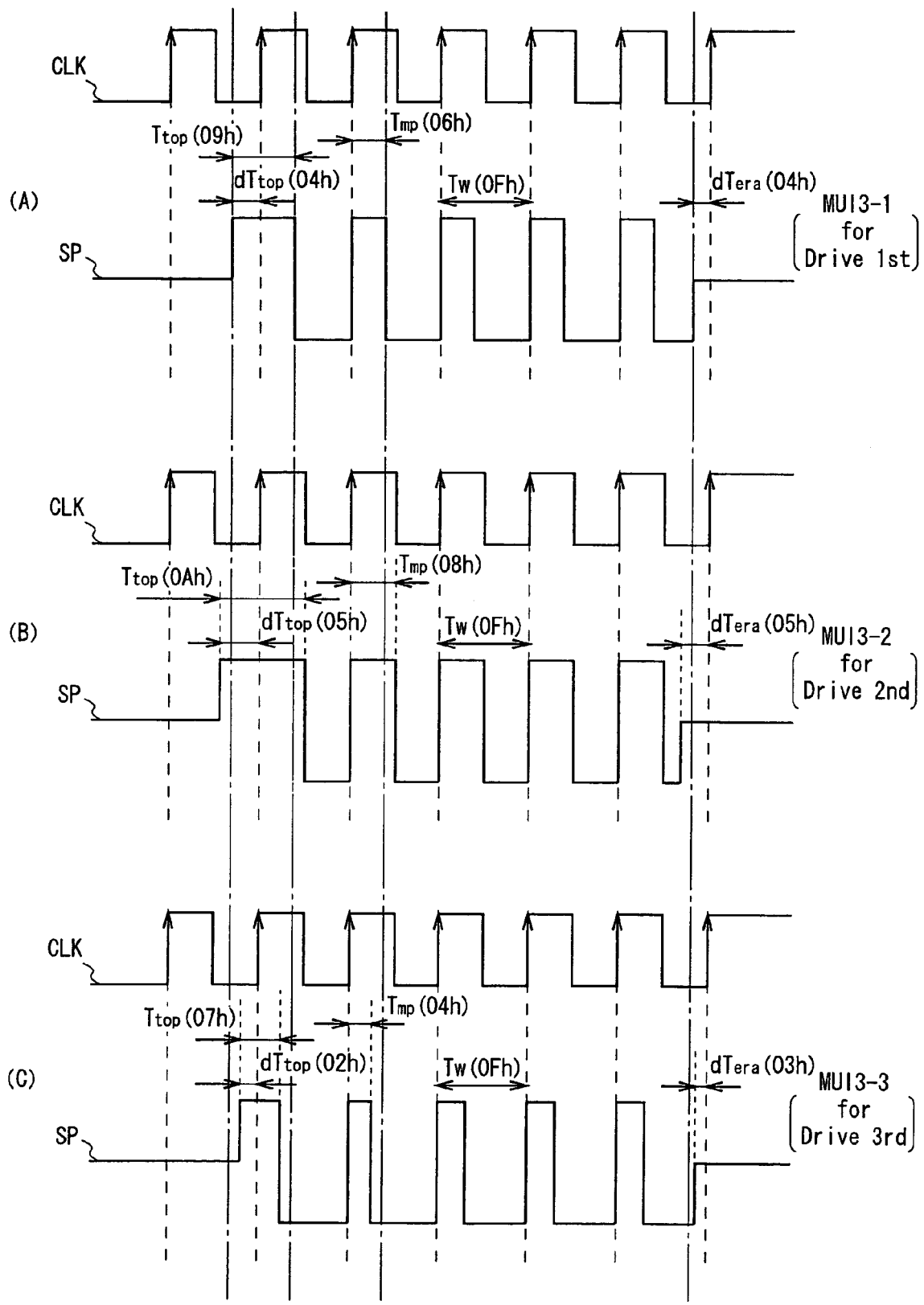
FIG. 5 is a schematic diagram showing details of operating condition information.

As shown in FIG. 5(A), FIG. 5(B) and FIG. 5(C), as the contents of the plural pieces of operating condition information MUI 3-1 to MUI 3-3, there are defined an irradiation time Ttop when the first laser beam is irradiated on the basis of an irradiation pulse SP for controlling the laser beam irradiation, an irradiation time Tmp when the second and subsequent laser beams are irradiated, a period Tw of the irradiation pulse SP, a start shift time dTtop indicating the difference between the rising timing of a reference clock CLK and the rising timing of the irradiation pulse SP, and an end shift time dTera indicating the difference between the rising timing of the reference clock CLK and an end timing of the irradiation pulse SP.

As shown in FIG. 4 and FIG. 5(A) to FIG. 5(C), in the plural pieces of operating condition information MUI 3-1 to MUI 3-3, the irradiation time Ttop, Tmp, the period Tw, the start shift time dTtop, and the end shift time dTera, are respectively defined so as to enable the most excellent recording characteristic in the optimal reflectance to be obtained for each combination of the optical disk 3C of the third generation with the disk drive devices 2A to 2C of each generation.

That is, in the combination of the disk drive device 2A of the first generation and the optical disk 3C of the third generation, when the operating condition information MUI 3-1 including the start shift time dTtop: "04h", the irradiation time Ttop: "09h", Tmp: "06h", the period Tw: "OFh", and the end shift time dTera: "04h" is set by the CPU 30, the disk drive device 2A of the first generation is capable of obtaining the most excellent recording characteristic in the optimal reflectance for the optical disk 3C of the third generation.

Also, in the combination of the disk drive device 2B of the second generation and the optical disk 3C of the third generation, when the operating condition information MUI 3-2 including the start shift time dTtop: "05h", the irradiation time Ttop: "0Ah", Tmp: "08h", the period: Tw "OFh", and the end shift time dTera: "05h" is set by the CPU 30, the disk drive device 2B of the second generation is capable of obtaining the most excellent recording characteristic in the optimal reflectance for the optical disk 3C of the third generation.

Further, in the combination of the disk drive device 2C of the third generation and the optical disk 3C of the third generation, when the operating condition information MUI 3-3 is set by the CPU 30 in the same manner, the disk drive device 2C of the third generation is capable of obtaining the most excellent recording characteristic in the optimal reflectance for the optical disk 3C of the third generation.

Figure 6:
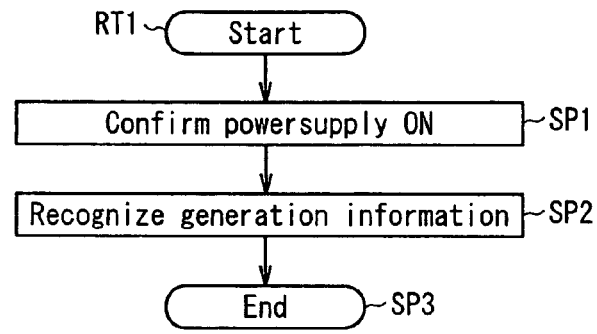
FIG. 6 is a flow chart showing a generation information recognition processing procedure.

(5) Generation Information Recognition Processing Procedure of Disk Drive Device Itself Next, the processing procedure in which the disk drive device 2 recognizes its own generation, is described with reference to a flow chart shown in FIG. 6. The CPU 30 of the disk drive device 2, after entering a start step of routine RT1, moves to the following step SP 1.

Upon confirming that the power supply has been switched on by a user in step SP 1, the CPU 30 move to the following step SP 2.

In step SP 2, the CPU 30 of the disk drive device 2 reads the generation information Ge from the DUIA area 36 of the ROM 35, to thereby recognize the generation of the drive device itself, and moves to the following step SP 3 to end the processing.

(6) Operating Condition Setting Processing Procedure by Disk Drive Device

Figure 7:
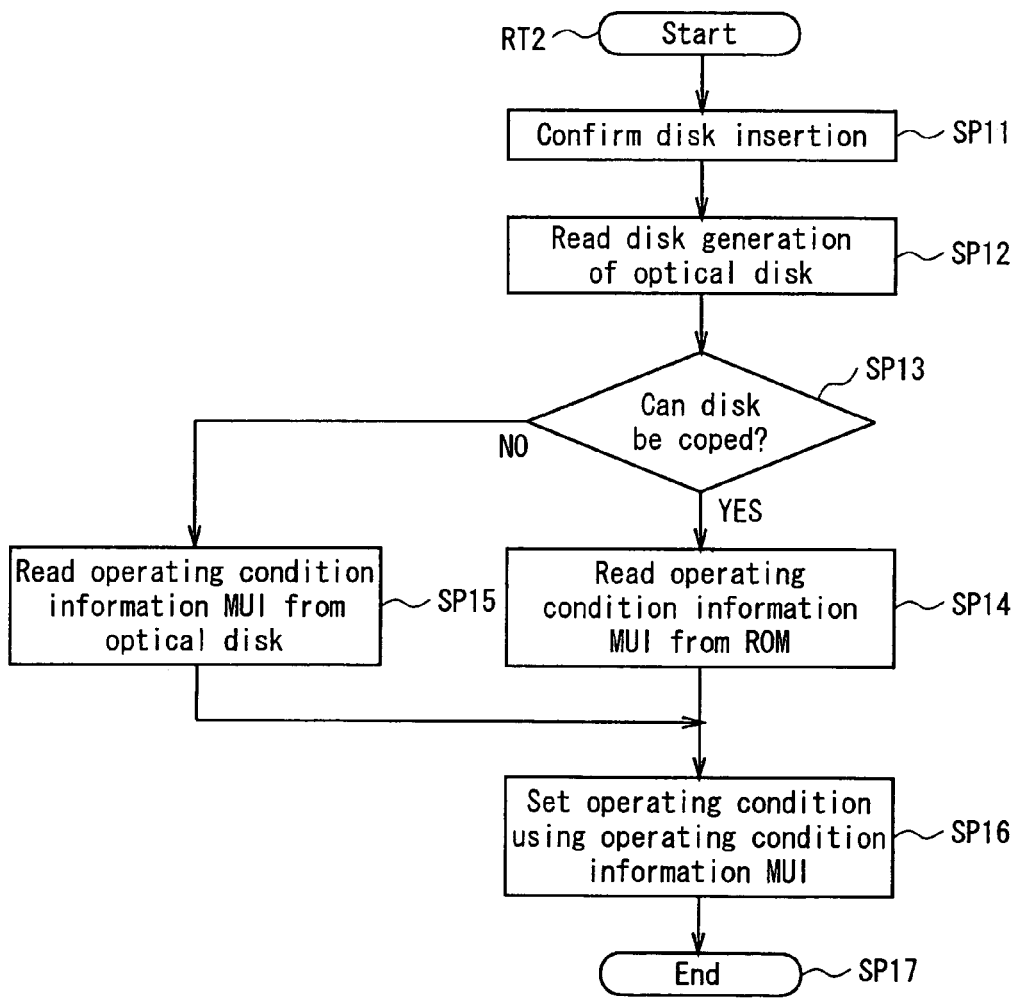
FIG. 7 is a flow chart showing an operating condition setting processing procedure.

Next, a processing procedure for setting the operating condition of the optical pickup 11 by using one of the operating condition information MUI stored in the DUIA area 36 of the ROM 35 in the disk drive device 2 and the operating condition information MUI stored in the MUIA area 52 of the optical disk 3, is described with reference to a flow chart shown in FIG. 7.

After entering a start step of routine RT2, the CPU 30 of the disk drive device 2 moves to the following step SP 11.

Upon confirming that the optical disk 3 is loaded by a user in step SP 11, the CPU 30 of the disk drive device 2 move to the following step SP 12.

In step SP 12, the CPU 30 of the disk drive device 2 reads the disk generation information from the MVIA area 51 of the optical disk 3, to recognize the generation of the optical disk 3, and then moves to the following step SP 13.

In step SP 13, in the case where the disk generation of the optical disk 3 is known and the operating condition information MUI enabling the most excellent recording characteristic in the optimal reflectance to be obtained for the disk generation of the optical disk 3 is stored in advance in the DUIA area 36 of the ROM 35, the CPU 30 of the disk drive device 2 determines that the optical disk 3 is known and can be coped by means of the operating condition information MUI, and otherwise, determines that the optical disk 3 is unknown and a new kind, and cannot be coped by means of the operating condition information MUI stored in the DUIA area 36.

Thus, when the affirmative result is obtained in step SP 13, the CPU 30 of the disk drive device 2 moves to the following step SP 14, and reads the operating condition information MUI corresponding to the disk generation of the optical disk 3 preliminarily stored in the DUIA area 36 of the ROM 35, and then moves to the following step SP 16.

On the other hand, when the negative result is obtained in step SP 13, the CPU 30 of the disk drive device 2 moves to the following step SP 15, and reads the operating condition information MUI which is recognized in the generation information recognition processing procedure of the above described routine RT1, and which is suitable for the generation of the disk drive device 2 itself, from the MUIA area 52 of the optical disk 3, and moves to the following step SP 16.

In step SP 16, the CPU 30 of the disk drive device 2 newly sets the operating condition, such as the irradiation time of the laser beam for the optical pickup 11, using the operating condition information MUI read in step SP 14 or step SP 15, and moves to the following step SP 17 to end the processing.

(7) Operation and Effect

In the above described configuration, the disk drive device 2 of the operation condition setting system 1 stores in the DUIA area 36 of the ROM 35, the operating condition information MUI for obtaining the most excellent recording characteristic in each combination with plural kinds of optical disks 3 of known generations which has been shipped prior to the generation of the disk drive device 2 itself.

Thereby, when one of plural kinds of optical disks 3 of known generations is loaded, the CPU 30 of the disk drive device 2 recognizes the disk generation of the optical disk 3, to read the operating condition information MUI suitable for the disk generation of the optical disk 3 from the DUIA area 36 of the ROM 35, and sets the operating condition, such as the irradiation time of the laser beam for the optical pickup 11, using the operating condition information MUI.

On the other hand, each time an optical disk 3 of a latest generation with a significantly improved recording characteristic is developed, the optical disk 3 is arranged to store plural pieces of operating condition information MUI enabling the most excellent recording characteristic to be obtained for each combination of the optical disk 3 of the latest generation with plural kinds of disk drive devices 3 of generations known at the point of time, in the MUIA area 52 in a form so as to make each piece of the operating condition information MUI correspond to the disk drive device 3 of each generation.

Thereby, in the case where the optical disk 3 of the latest generation is loaded, even when the disk drive device 2 cannot cope with the optical disk 3 of the latest generation without updating the firmware, because the disk drive device 2 is not storing the operating condition information MUI enabling the most excellent recording characteristic to be obtained for the optical disk 3 of the latest generation, the, CPU 30 of the disk drive device 2 can read the operating condition information MUI corresponding to the latest generation of the disk drive device 2 from the MUIA area 52 of the optical disk 3 and set the operating condition using the operating condition information MUI.

Accordingly, even in the case of a disk drive device 2 of an old generation, the operating condition information MUI for enabling the most excellent recording characteristic to be obtained for the latest optical disk 3 can be read from the MUIA area 52 of the optical disk 3 and acquired, so that the operating condition can be set by using the operating condition information MUI.

That is, in the operation condition setting system 1, plural kinds of operating condition information MUI enabling each disk drive device 2 of old generation to correspond to the optical disk 3 of the latest generation, are arranged to be stored on the side of the optical disk 3 of the latest generation so as to afford compensation, as a result of which even in the case where the optical disk 3 of the latest generation unknown to the disk drive device 2 of old generation is loaded, the operating condition enabling the most excellent reflective characteristic in the optimal reflectance to be obtained, can be surely set.

In the operation condition setting system 1, the operating condition for enabling the most excellent reflective characteristic in the optimal reflectance to be obtained, can be set only on the basis of the relationship between the disk drive device 2 and the optical disk 3, as a result of which the operating condition for obtaining the most excellent recording characteristic, can be set without forcing a user to perform complicated operations, such as of making an access to a server and the like via a network such as the Internet to download a new firmware from the server for updating, and entirely without making the user aware of updating of the firmware.

Further, in the operation condition setting system 1, the operating condition information MUI is arranged to be stored as the read only data in a non-rewritable form in the DUIA area 36 of the disk drive device 2 and in the MUIA area 52 of the optical disk 3, as a result of which a disadvantage that the operating condition information MUI is rewritten or erased by carelessness of a user and the like, can be avoided in advance, and the operating condition can be surely set.

According to the above described configuration, in the operation condition setting system 1, the best recording characteristic can always be obtained for each combination of the disk drive device 2 of any generation and the optical disk of any generation, regardless of the generation of the disk drive device 2 and the optical disk 3.

(8) Other Embodiment

In the above described embodiment, there is described the case where the first operating condition information is directed to the irradiation time of the laser beam for obtaining the most excellent recording characteristic in the optimal reflectance at the time of data recording, but the invention is not limited to the case, and the first operating condition information may also be directed to the number of irradiation of the laser beam (pulse number), in addition to the irradiation time of the laser beam.

In above described embodiment, there is also described the case where the present invention is applied to the case where the generation of the disk drive device 2 is changed as the recording characteristic of the disk drive device 2 is improved, and to the case where the generation of the optical disk 3 is changed as the recording characteristic of the optical disk 3 is improved, but the invention is not limited to the case, and the present invention may also be applied to the case where the recording characteristics of the disk drive device 2 and the optical disk 3 are different for each manufacturer.

Further, in above described embodiment, there is described the case where the drive device is directed to the disk drive device 2 and the recording medium is directed to the optical disk 3, but the invention is not limited to the case, and the drive device may be directed to a tape recorder and the recording medium may be directed to a tape shaped recording medium, or the drive device may also be directed to a MD (Mini Disk) recorder and the recording medium may also be directed to a MD.

Further, in the above described embodiment, there is described the case where the operating condition is arranged to be set at the time of writing data in the disk drive device 2, but the invention is not limited to the case, and the operating condition may also be arranged to be set at the time of reading data.

Further, in the above described embodiment, there is described the case where the operation condition setting system 1 is constituted by the optical disk 3 as the recording medium, and the disk drive device 2 as the drive device comprising the ROM 35 as the storage means, the CPU 30 as the discrimination means and the control means, but the invention is not limited to the case, and the operation condition setting system may also be constituted to include other various configurations.

INDUSTRIAL APPLICABILITY

The operation condition setting system according to the present invention can be applied for setting the operation condition for obtaining the best recording characteristic in each combination, for example, between the drive device and the recording medium, even in the case where a new kind of drive device or a new kind of recording medium is developed.

The invention claimed is:

1. An operation condition setting system, having plural kinds of recording media, and plural kinds of drive devices setting an operating condition for an optical system to make the operating condition suitable for each of the plural kinds of recording media,
wherein each of said recording media comprises:
a specific read only area respectively storing plural pieces of first operating condition information for the optical system, which cannot be known by said drive devices as the recording medium is new to the drive devices, and which are suitable for the recording medium new to the drive devices,
wherein each of said drive devices comprises:
storage means respectively storing plural pieces of second operating condition information for the optical system suitable for the recording media of kinds known to the drive device;
discrimination means, in the case where said second operating condition information suitable for one of said plural kinds of recording media loaded into the drive device is stored in said storage means, discriminating the loaded recording medium as one of said known kinds of recording media, and in the case where said second operating condition information suitable for one of said plural kinds of recording media loaded into the drive devices is not stored in said storage means, discriminating the loaded recording medium as said new kind of recording medium; and
control means, in the case where the loaded recording medium is discriminated as one of said known kinds of recording media, setting the operating condition for said optical system using the second operating condition information, and in the case where the loaded recording medium is discriminated as said new kind of recording medium, reading said first operating condition information suitable for the drive device from said specific read only area in the new kind of recording medium, and setting the operating condition for said optical system using the first operating condition information.

2. The operation condition setting system according to claim 1,
wherein each of said first operating condition information and said second operating condition information is an irradiation time of said optical system to said recording medium in setting said operating condition.

3. The operation condition setting system according to claim 1,
wherein said storage means is read only storage means.

4. A drive device setting an operating condition for an optical system to make the operating condition correspond to each of plural kinds of recording media, comprising;
reading means reading first operating condition information for said optical system, which cannot be known by the drive device for each of the new kinds of recording media, and which is suitable for the new kind of recording medium, from said new kind of recording medium, in a specific read only area of which the first operating condition information is stored;
storage means respectively storing plural pieces of second operating information for said optical system suitable for the recording media of kinds known to the drive device;
discrimination means, in the case where said second operating condition information suitable for one of said plural kinds of recording media loaded into the drive device is stored in said storage means, discriminating the loaded recording medium as one of said known kinds of recording media, and in the case where said second operating condition information suitable for one of said plural kinds of recording media loaded into the drive devices is not stored in said storage means, discriminating the loaded recording medium as said new kind of recording medium; and
control means, in the case where the loaded recording medium is discriminated as one of said known kinds of recording media, setting the operating condition for said optical system using the second operating condition information, and in the case where the loaded recording medium is discriminated as said new kind of recording medium, reading said first operating condition information suitable for the drive device from said specific read only area in the new kind of recording medium, and setting the operating condition for said optical system using the first operating condition information.

5. An operation condition setting method for setting an operating condition for an optical system to make the operating condition correspond to plural kinds of recording media, comprising the steps of:
reading first operating condition information for said optical system, which cannot be known by a drive device for each of the new kinds of recording media, and which is suitable for the new kind of recording medium, from said new kind of recording medium, in a specific read only area of which the new kind of the first operating condition information is stored;
in the case where second operating condition information suitable for one of said plural kinds of recording media loaded into the drive device is stored in storage means, discriminating the loaded recording medium as one of known kinds of recording media, and in the case where said second operating condition information suitable for one of said plural kinds of recording media loaded into the drive devices is not stored in said storage means, discriminating the loaded recording medium as one of said new kinds of recording media; and
in the case where the loaded recording medium is discriminated as one of said known kinds of recording media, setting the operating condition for said optical system using the second operating condition information, and in the case where the loaded recording medium is discriminated as one of said new kinds of recording media, reading said first operating condition information suitable for the drive device from said specific read only area in the new kind of recording medium, and setting the operating condition for said optical system using the first operating condition information.

6. A recording medium comprising
a specific read only area storing each piece of operating condition information which cannot be known by a known kind of drive device and which is suitable for making an optical system of the known kind of drive device access the recording medium.

* * * * *